United States Patent Office 3,740,194
Patented June 19, 1973

3,740,194
ADIABATIC CALORIMETRY
Brian Norman Hendy, Knebworth, England, assignor to Imperial Chemical Industries Limited, London, England
Filed Apr. 24, 1970, Ser. No. 31,565
Int. Cl. G01n 25/20, 27/32, 25/48
U.S. Cl. 23—230 A
14 Claims

ABSTRACT OF THE DISCLOSURE

A means for controlling monomer feeding when making homogeneous copolymers involves the determination of the rate of reaction during the process using adiabatic calorimetry. A small sample is isolated from the reaction mixture and maintained under adiabatic conditions for a short period, while the reaction rate is determined from the rate of change of temperature of the sample. The sample is then returned to the reaction mixture. Both intermittent and continuous sampling are exemplified.

---

Figure 1:
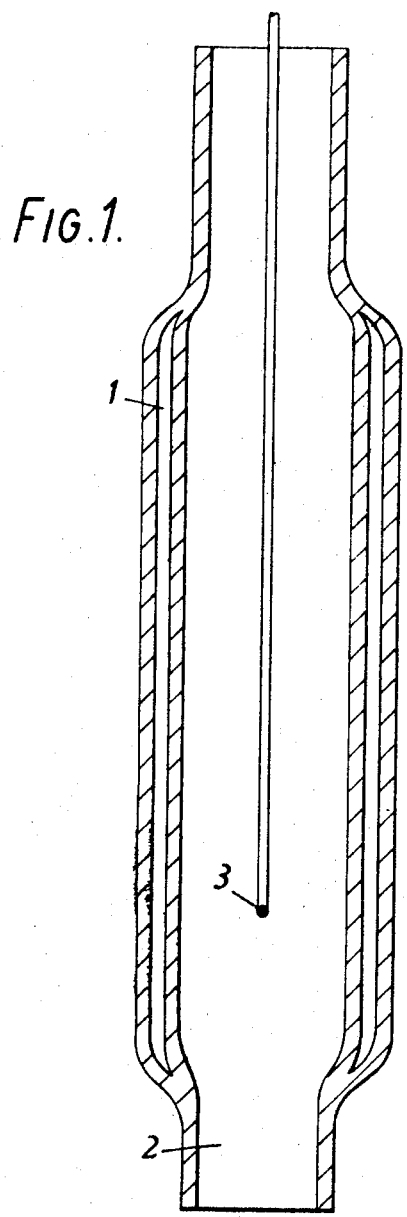

This invention relates to a method for measuring the rate of reaction during a chemical process, especially emulsion or granular polymer formation, by adiabatic calorimetry employing non-destructive sampling, and in particular to the application of this determination to the control of copolymerisation reaction when monomer is being fed as the reaction proceeds.

The rate of a chemical reaction, e.g. polymerisation, may be determined by any of the usual methods but those generally employed in kinetic experiments in the laboratory are not always readily applicable to preparative operations particularly when commercial scales are involved. Chemical methods consume product destructively, require an operator and may not furnish information about the reaction sufficiently quickly. Similar disadvantages occur with solids content determinations made by evaporation of samples to dryness and weighing the residues. and, to some extent, with chromatography. Some physical methods such as dilatometry would be difficult to apply on a large scale, and spectroscopic techniques require expensive apparatus and may be restricted to certain reactants or be affected by other ingredients of the recipe. Measurements of density and opacity are rather insensitive in emulsion systems.

According to the present invention a method of testing applicable to the improvement or control of the manufacture of chemical substances comprises measuring the rate of a chemical reaction in a reaction mixture by temporarily isolating a sample of the reaction mixture and maintaining it under adiabatic conditions while recording its change of temperature with time. The heat liberated or consumed during the reaction may thereby be readily measured without destroying any of the product, and such measurements, which may be carried out continuously, are not dependent on the nature of the reaction medium.

This method may be employed for any reaction in which the change in temperature of the sample of reaction mixture is sufficiently high to be measured. This will depend not only on the amount of heat liberated or consumed by the reactants themselves, but also on the heat capacity of the environment, e.g. the diluent. The reaction mixture must also be sufficiently fluid to allow samples to be isolated.

The samples may be small individual aliquots, or in the form of a continuous stream maintained under adiabatic conditions. The retention time is kept short so that the course of the reaction in the isolated sample is substantially unaffected. The system may be calibrated in a preliminary experiment by use of solids content or other determinations. In this way non-random errors may be cancelled.

For example, a small sample of the reaction mixture may be passed through a small orifice into a dip-leg, the wall of which is insulated thermally from the bulk of the reaction mixture by means of a silvered vacuum jacket. The temperature change within the small isolated sample is measured over a short period of time by means of a sensitive thermometer having a low heat capacity and rapid response, e.g. a thermocouple, a gas on vapour bulb thermometer, a resistance thermometer or a thermistor. The used sample is returned to the bulk of the reaction mixture and another sample may then be taken, the measurement being repeated as often as desired. The course of the reaction can then be followed by integration of these spot adiabatic rate measurements.

A specific embodiment of such a dip-leg is illustrated in FIG. 1 which shows a cross-section of the dip-leg comprising a double-walled glass tube having an internal diameter of 1.3 cm. and length 10 cm. The walls of the tube 1 are silvered and the space between them is evacuated to insulate thermally the contents of the dip-leg from the surrounding environment. In order to minimise mixing between the sample and the bulk of the reaction mixture, the lower end narrows to a constricted opening 2, with an internal diameter of 0.8 cm. Suspended in the centre of the tube is a multi-thermocouple 3.

In use the dip-leg is immersed in the reaction mixture, and a small quantity of the reaction mixture, being sufficient to cover the thermocouple, is allowed to run into the tube. The observation time will depend on the particular reaction being tested, in particular it will depend on the amount of heat liberated or consumed. After one sample has been measured and returned to the reaction mixture, another sample may be taken. From the rise in temperature of these samples is calculated the rate at which heat is being evolved. Thus the course of the reaction is followed.

Figure 2:
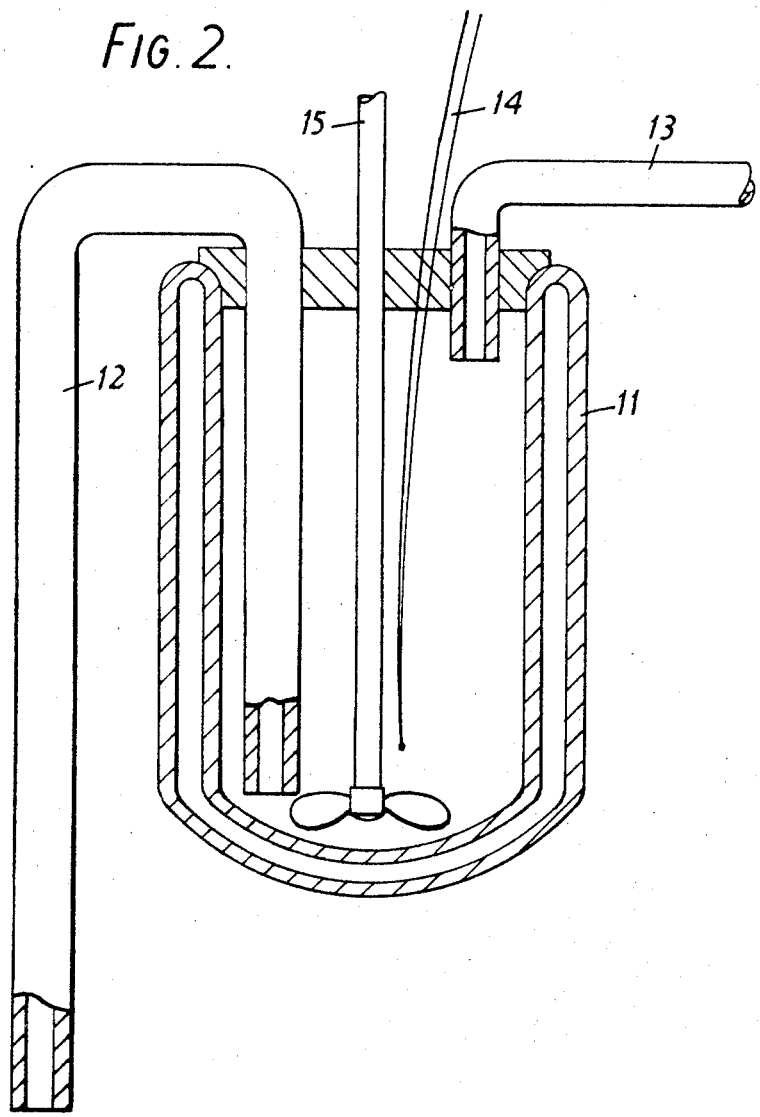

The operation of testing the small isolated sample need not be carried out within the confines of the reaction vessel. In particular, where agitation of the reaction mixture is required to avoid settling-out of a component, a larger volume may be required to accommodate a stirrer and it may be more convenient to insert a probe into the reaction vessel, withdraw a sample into a thermally insulated vessel separate from the reaction vessel, measure the rate of change of temperature in the sample, and return the sample to the bulk of the reaction mixture. This is illustrated by reference to FIG. 2 of the drawings, which shows a cross-section of a testing vessel. The testing vessel 11 having insulating walls, e.g. a Dewar vessel, is fitted with a probe 12, a tube 13, a thermometer 14 and optionally a stirrer 15. In use the probe is inserted into the reaction vessel and a small sample is withdrawn into the testing vessel by means of vacuum applied to the tube 13. The rise in temperature with time is measured as before and the sample is returned to the bulk reaction mixture.

In both forms of intermittent testing described above it is not necessary to carry out any extensive modification of existing reaction vessels. Normal autoclaves may be used and the dip-leg or probe for carrying out the test is merely inserted through existing sample holes.

Adiabatic calorimetric testing of small samples of reaction mixture according to the invention need not be limited to intermittent sampling. Continuous testing of the reaction mixture is possible with apparatus comprising a testing tube which is thermally lagged and has a sensitive thermometer at each end, an inlet tube for conveying the sample mixture from the reaction vessel to the testing tube, an outlet tube for returning the sample to the reaction vessel, and means for pumping the sample at a known rate through the system.

Figure 3:
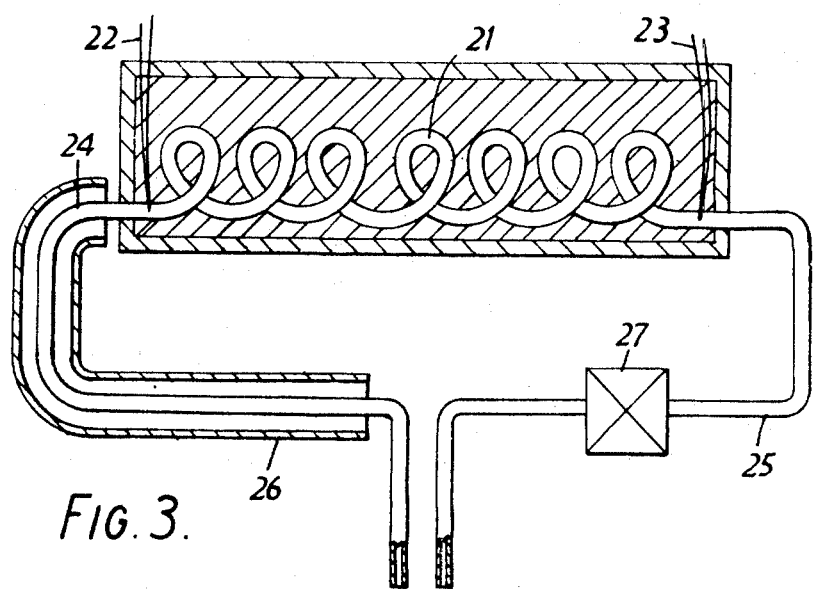

To illustrate this method the principal features of a suitable apparatus are illustrated in FIG. 3 of the drawings. The testing means comprises a testing tube 21 which is well lagged, having a thermometer 22, 23, e.g. a thermocouple, at each end. The coils of the testing tube must also be insulated one from another, and a foam of low heat conductivity may be used. An inlet tube 24 connects the reaction vessel with the inlet end of the testing tube 21, while an outlet tube 25 connects the outlet end of the testing tube to the reaction vessel to complete the closed system. The inlet tube 24 has a jacket 26 to maintain the temperature of the sample constant, and a pump 27 is incorporated into the outlet tube 25.

In operation the sample is pumped from the reaction vessel through the inlet tube during which time the temperature of the sample is kept constant, the most convenient temperature being that of the reaction vessel. At any different temperature a correction for the temperature dependence of the reaction rate would have to be applied. On passing the sample through the testing tube 21 the reaction is carried out under adiabatic conditions and the temperature rise is measured by the difference in the two thermometer readings. The rate of pumping may be varied as required but once the rate has been set the pump must be capable of pumping the samples around the system at a rate which is constant, known and reproducible. The circulation of the sample through the reaction tube is sufficiently fast to prevent settling-out of any latex or solid particles in the reaction mixture. Where different reactions having different heat outputs are to be tested the observation time must be varied by choice of a suitable tube or pumping rate.

Figure 4:
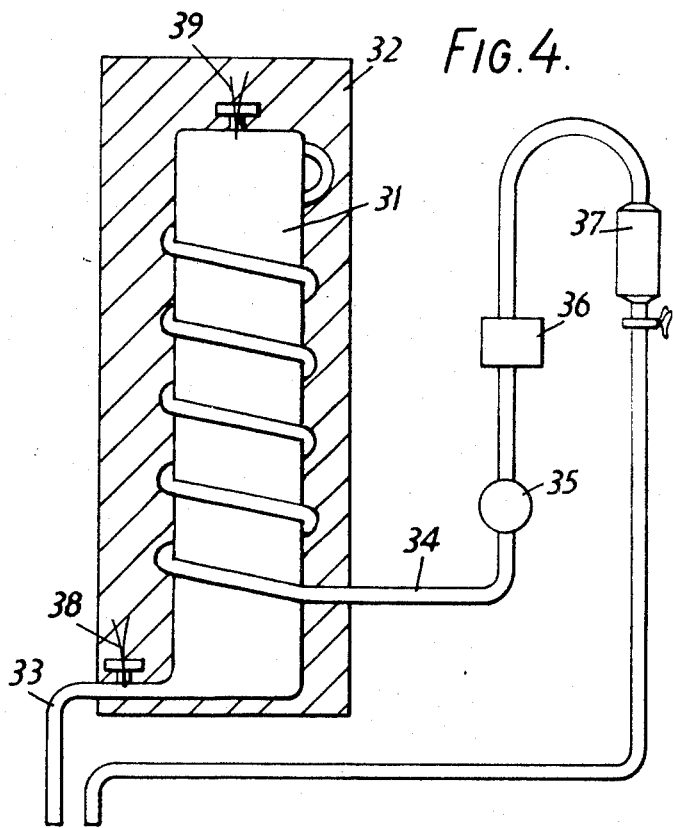

A specific embodiment of the above testing means employing a straight tube for use with continuous sampling is shown in FIG. 4. A cylindrical glass testing-tube 31 of 500 ml. capacity and having a bore of 4 cm. is enclosed in a thermally insulating jacket 32. Inlet 33 and outlet 34 tubes are provided having a much smaller bore than the testing-tube, the outlet tube being embedded in the insulation jacket to reduce the temperature gradient between the reactants and the surroundings, so as to minimise heat losses. The outlet tube is connected in turn to a centrifugal pump 35, a flow-rate meter 36 and a flow-rate check 37 and thence back to the reaction vessel by means of polythene tubing. The flow-rate check comprises a 200 ml. dropping funnel fitted with a stop-cock having a 6 mm. bore. The two ends of the testing-tube are supplied with chromed Alumel multi-thermocouples 38 and 39.

The apparatus is used in the same manner as that illustrated in FIG. 3. The reaction mixture is pumped through the testing tube, the inlet and outlet temperatures of the mixture being measured by the thermocouples. The flow is adjusted to give the required residence time, and is measured by the flow-rate meter. This is calibrated and may be checked at any time by the flow-rate check which collects and measures the amount of reaction mixture circulating, the sample then being returned to the bulk of the reaction mixture. The inlet tube should be short or be maintained at constant temperature to prevent any change in the reaction rate before the mixture is passed through the testing tube, but the exit tube need not be maintained at a constant temperature. The calculation based on a temperature difference between the thermometers for a given flow rate is the same as for the other methods described above.

For the continuous, as for the intermittent, testing methods described above, special adaptation of existing reaction vessels is not required, as the inlet and outlet tubes may be brought together and inserted in the form of a probe as before, but having two separate tubes instead of one.

The present invention may advantageously be used in particular in the control of non-viscous polymerisations, particularly in emulsion, suspension, or diluent systems e.g. Zeigler processes for polyolefines, in dilute solution, or in bulk when the polymer produced precipitates. These techniques may also be extended to use in continuous polymerisation reactions or in bulk polymerisations where the viscous mass is forced at high temperatures through an extruder barrel, or to any polymerisation process in which the sufficient heat is evolved or absorbed relative to the heat capacity of the other ingredients of the reaction medium and where the reactants are sufficiently mobile to allow samples to be taken.

The method of the invention is particularly useful in the manufacture of copolymers under conditions of free-radical catalysis from any polymerisable or copolymerisable monomer such as an aromatic olefin monomer in which the functional ethylenic bond is conjugated to an aromatic ring, as for example in styrene, α-methylstyrene, o-methylstyrene, m-methylstyrene, p-methylstyrene, 2,5-dimethyl-styrene, p - methoxystyrene, p - dimethylaminostyrene, p-acetaminostyrene, m-vinylphenol, p-trimethylsilylstyrene, ar-dibromostyrene, 1-vinylnaphthalene, acenaphthylene, 3-vinylphenanthrene, 2-vinylthiophene, indene, coumarone, N-vinylcarbazole or a vinyl pyridine (e.g. 2-methyl-5-vinylpyridine); or a monomer such as vinyl acetate, and other vinyl esters, butadiene, isoprene, ethylene, propene, isobutene, 2-methylpent-1-ene, 4-methylpent-1-ene, vinyl chloride or vinylidene chloride, vinyl fluoride, vinylidene fluoride, hexafluoropropene, tetrafluoroethylene, chlorotrifluoroethylene; or an electron-deficient vinyl monomer, for example acrolein, methacrolein, acrylonitrile, methacrylonitrile, α-acetoxyacrylonitrile, acrylic acid, and methacrylic acid and esters thereof, cinnamonitrile, chloroacrylonitrile, fumaronitrile, maleonitrile, or maleic anhydride, and also alkyl vinyl and alkyl isopropenyl ketones, ethers and sulphones, e.g. vinyl methyl ether, vinyl ethyl ether and vinyl methyl sulphone. The method is useful in the preparation of homogeneous copolymers containing units derived from monomers which when mixed would tend to form a copolymer of a composition differing from that of the monomer mixture, e.g., by exhibiting a strong tendency to form an alternating copolymer. It is particularly useful when at least 50 mole percent of monomer reacted is acrylonitrile. It is also useful for polymerising such monomers in the presence of a polymer substrate, e.g. a diene rubber, when a graft copolymer may be formed with a randomly copolymerised superstrate.

Many polymer-forming reactions, in particular vinyl polymerisations, are strongly exothermic, the reaction being generally controlled by applying cooling water to the vessel to maintain constant temperature. It would not be practicable to carry out these polymerisations without removing the heat generated, because the resulting rise in temperature would adversely affect the process. For example, the relative rates of chain propagation, transfer and termination would be changed by the rising temperature thus affecting the molecular weight distribution and hence the physical properties of the polymer; unwanted side-reactions may interfere; the phase relationship of a heterogeneous system might be altered (which may result in a latex becoming unstable or a monomer becoming soluble in a diluent); and the reaction may speed up until it is out of control. It is not generally practicable, therefore, to isolate the whole of the reaction mixture under adiabatic conditions, but small samples may be isolated for short periods and their rise in temperature measured. It is also necessary to ensure that the temperature rise in the isolated sample is not too great because this may itself accelerate the reaction and cause the rate measurement to be in error. However, such errors can generally be cancelled by calibration of the system in a prior experiment.

Samples for observation can be withdrawn frequently, e.g. every 30 seconds, and the observation time varied until sufficient temperature change is observed. For slow reactions the observation time will be long, e.g. 60 seconds, while for fast reactions it will be kept short, e.g. 12 seconds. The dip-leg is very suitable for use with polymerisation reactions having a rate of increase in temperature of the order of 1 deg. C. per minute. The sample is then held until the temperature has risen by 0.2 deg. C., i.e. for a time of about 12 seconds. This observation time varies according to the rate of the particular reaction being carried out, and according to how exothermic the reaction is.

It is necessary to ensure that the sample vessel or tube does not allow the sample to become contaminated so as to retard or accelerate the reaction. Thus, for instance, if air is allowed to intrude into the space it will inhibit a vinyl polymerisation reaction and if any component of the apparatus is made of a substance which will discharge into the reactants a metal ion capable of undergoing oxidation or reduction (e.g. $Fe^{2+}$, $Fe^{3+}$), it may accelerate a vinyl polymerisation initiated by a redox system as in activated persulphate recipes.

Knowledge of the heat of the reaction is necessary since it is from the rate at which the temperature changes, and therefore the rate at which the heat is produced or consumed, that the rate of reaction is determined. Data of this type are uncommon for copolymerisation reactions, but in general it is sufficient to calculate a value from the heats of homopolymerisation which have been published for all common monomers or can be calculated theoretically. They may even be guessed reliably by comparison of the chemical structure of the monomer in question with similar molecules of known heats of polymerisation.

The total heat evolved if an entire batch containing monomers $M_1$ and $M_2$ is converted completely to copolymer is then:

$$\Delta H \text{ copolymer} = \Delta H \text{ poly}(M_1) \times \text{moles of } M_1 + \Delta H \text{ poly}(M_2) \times \text{moles of } M_2$$

The simple relationship between heat of copolymerisation and composition presumed by the use of this equation is not strictly true and deviations from it can be expected. The equation, however, is adequate for use with a first experiment because subseuent analysis of the copolymer product gives an immediate indication of how much in error the assumed heat of copolymerisation is and empirical corrections can then be made in subsequent experiments. In any case, errors arise from other sources and it is convenient to calibrate these out by using an empirically determined apparent heat of copolymerisation to suit the particular apparatus.

In the production of a copolymer it is not uncommon to find that one of the monomers copolymerises more readily than another, with the result that in a conventional batch process a relatively high proportion of the more reactive monomer is incorporated in the polymer formed early in the reaction leaving a relatively low proportion in the monomer mixture to be incorporated into the polymer formed later on. Non-homogeneous copolymers produced in this way often have disappointing mechanical properties. A homogeneous copolymer can be produced from such a monomer system by adding at least one monomer to the reaction mixture at a rate determined by the rate of polymerisation, i.e. as the reaction proceeds the more reactive monomer is added to the reaction mixture containing the less reactive monomer.

In the industrial production of homogeneous copolymers either method of carrying out the invention, i.e. intermittent or continuous sampling, may be used for the continuous metering of monomers. Whether the testing is carried out by sampling at regular intervals using a dip-leg or probe, or by continuously pumping the sample through a thermally insulated testing tube, a given rise in temperature is equivalent to a definite quantity of monomers required.

This technique is therefore particularly useful as a means of controlling monomer feeding when making copolymers of homogeneous composition.

The invention is further illustrated by reference to the copolymerization of acrylonitrile and styrene. For the production of homogeneous acrylonitrile/styrene copolymers having a major molar proportion of acrylonitrile, it is necessary to add styrene (or both monomers) to the reaction mixture at the rate at which the reaction proceeds. When both monomers are being fed to the reaction mixture, it is necessary to feed a monomer mixture which has the same composition as the copolymer being formed, and to feed it at the rate of polymerisation. The amount and composition of the monomer in the reaction mixture thereby remains constant. When only the more reactive monomer (i.e. styrene) is being fed, it is added to a diminishing amount of polymerising monomer mixture at such a rate that the composition is maintained constant. The amount of styrene to be added at any time during the reaction may readily be determined once the amount of heat liberated has been calculated from the integration of the heat outputs of the samples, by the following relationship:

$$\frac{\text{amount of styrene added}}{\text{total amout of styrene to be fed}} = \frac{\text{heat liberated}}{\text{heat liberated by complete copolymerisation of all the monomers}}$$

Figure 5:
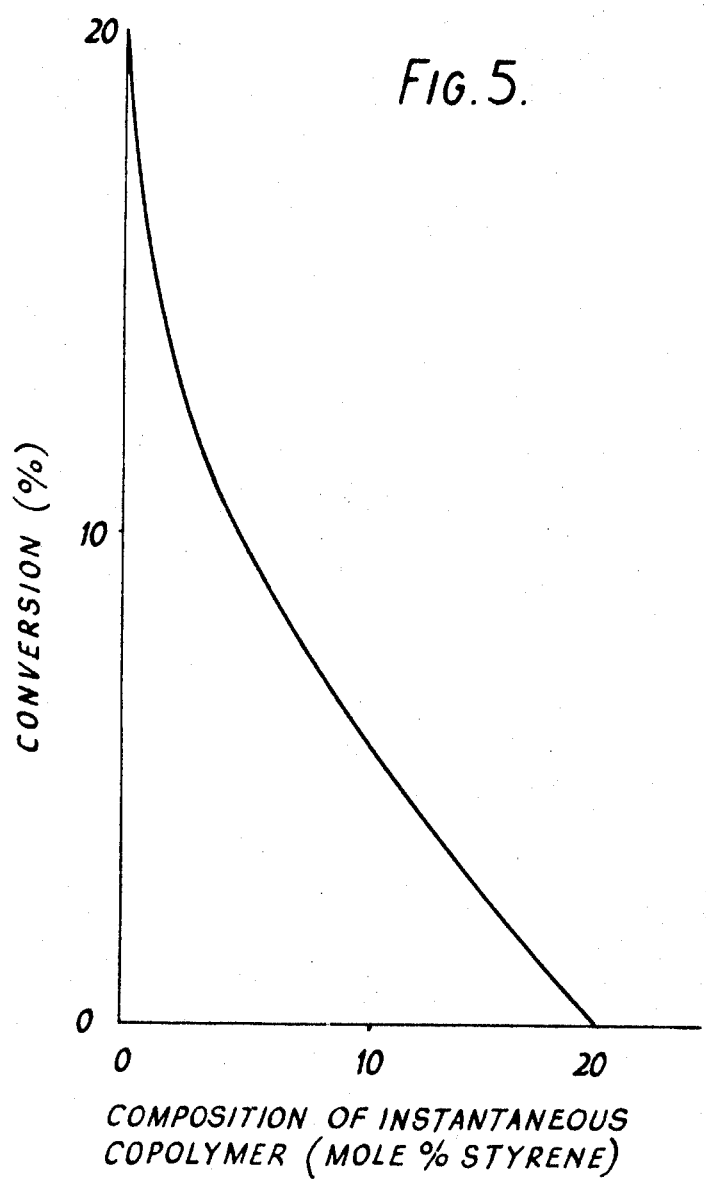

Since each of the monomers enters the copolymer at a different rate, the sample must not be withheld from the reaction for so long that the copolymer being formed within it begins to differ appreciably both in composition and in reaction rate from that of the bulk of the reaction mixture which is continuously being replenished with styrene or monomer mixture. For example, a reaction mixture containing 1.3 mole percent of styrene initially forms a copolymer containing 19.6 mole percent of styrene. If the reactants are unfed for 0.5% of the reaction the composition of the polymer being formed changes by 1 mole percent to 18.6 mole percent of styrene (FIG. 5). Where the reactants are in an aqueous diluent comprising 1 part of monomer to 2 parts of water then the corresponding temperature rise is about 0.5 deg. C.

I claim:

1. A method for measuring the reaction rate and thereby controlling the reaction in a chemical process carried out with a chemical reaction mixture maintained under non-adiabatic conditions comprising measuring the rate of said reaction by temporarily isolating a sample of the reaction mixture and maintaining the sample under adiabatic conditions while recording the temperature change of said mixture over a short period of time and relating said temperature change to the heat of reaction of said mixture in said chemical process.

2. A method according to claim 1 in which the chemical reaction is exothermic and the rate of rise in temperature of the sample is recorded.

3. A method as set forth in claim 1 in which the non-adiabatic conditions are maintained under constant temperature.

4. A method according to claim 1 in which the samples comprise at least one small aliquot of the reaction mixture.

5. A method according to claim 4 wherein the sample is continuously isolated from but is housed within the reaction mixture.

6. A method according to claim 1 in which the sample comprises a continuous stream of the reaction mixture.

7. A method according to claim 6 wherein the sample is continuously isolated from but is housed within the reaction mixture.

8. A method of producing homogeneous copolymers from a polymerisable monomer mixture having different rates of copolymerisation wherein at least one of the monomers in said mixture is added to the reaction mixture at a controlled rate determined by the polymerisation reaction rate as measured by the method of claim 1.

9. The method according to claim 8 in which the monomer mixture comprises acrylonitrile and at least one ethylenically unsaturated monomer copolymerisable therewith.

10. The method according to claim 9 in which at least one of the said ethylenically unsaturated monomers is a conjugated aromatic olefine in amount less than the amount of acrylonitrile, and where at least some of at least the aromatic olefine is fed to the reaction mixture.

11. The method according to claim 10 in which the aromatic olefine is styrene.

12. The method according to claim 8 in which one of the monomers is vinyl chloride.

13. The method according to claim 8 in which one of the monomers is vinylidene chloride.

14. A method for controlling the rate of feeding a reactant to a reaction mixture in a chemical process carried out with a chemical reaction mixture maintained under non-adiabatic conditions including the step of determining the rate of said reaction comprising measuring the rate of said reaction by temporarily isolating a sample of the reaction mixture and maintaining the sample under adiabatic conditions while recording the temperature change of said mixture over a short period of time and relating said temperature change to the heat of reaction of said mixture in said chemical process and feeding the reactant at a rate related to the thus determined reaction rate.

References Cited
UNITED STATES PATENTS

| | | | |
|---|---|---|---|
| 3,254,071 | 5/1966 | Morgan et al. | 23—253 A |
| 3,257,375 | 6/1966 | Norwood | 23—253 A |
| 3,276,843 | 10/1966 | Cooper, Jr. | 23—230 A |
| 3,414,382 | 12/1968 | Kapff et al. | 23—203 PC |
| 3,574,549 | 4/1971 | Eggertsen | 23—230 PC |
| 3,645,697 | 2/1972 | Hoffman, Jr. | 23—230 A |

OTHER REFERENCES

Glasstone: "Textbook of Physical Chemistry," 2nd edit., D. Van Nostrand Co., Inc., 1946, pp. 207–208.

MORRIS O. WOLK, Primary Examiner

R. E. SERWIN, Assistant Examiner

U.S. Cl. X.R.

23—253 A; 73—15 B; 260—695, 700